(12) United States Patent
Yeandle et al.

(10) Patent No.: US 6,312,165 B1
(45) Date of Patent: Nov. 6, 2001

(54) MANUFACTURE OF AN OPTICS PACKAGE

(75) Inventors: Jonathan Charles Yeandle, Paignton; Andrew Paul Cornish, Swindon, both of (GB)

(73) Assignee: Bookham Technology PLC (GB)

( * ) Notice: Subject to any disclaimer, the term of this patent is extended or adjusted under 35 U.S.C. 154(b) by 0 days.

(21) Appl. No.: 09/175,848

(22) Filed: Oct. 20, 1998

(30) Foreign Application Priority Data

Aug. 12, 1998 (GB) .................................................. 9817562

(51) Int. Cl.$^7$ ....................................................... G02B 6/36
(52) U.S. Cl. .................. 385/88; 385/92; 385/14; 385/49; 385/139; 385/80
(58) Field of Search ............................. 385/92, 134, 135, 385/129, 88, 80, 89, 14, 49, 139

(56) References Cited

U.S. PATENT DOCUMENTS

| | | | |
|---|---|---|---|
| 4,997,243 | * 3/1991 | Aiki et al. ............................... | 385/92 |
| 5,018,817 | 5/1991 | Suzuki et al. ....................... | 350/96.17 |
| 5,268,986 | * 12/1993 | Kakii et al. ............................ | 385/135 |
| 5,694,506 | 12/1997 | Kobayashi et al. ..................... | 385/60 |
| 5,991,487 | * 11/1999 | Sugiyama .............................. | 385/129 |

FOREIGN PATENT DOCUMENTS 2313676    12/1997  (GB) .

11-202155    7/1999  (JP) .................................... 385/92 X

OTHER PUBLICATIONS

UK search report re application No. GB 9817562.3, dated Jan. 26, 1999.
International Search Report for application No. PCT/GB99/01494, dated Aug. 9, 1999.
Mitachi, S. et al, "Trend in the Technology and Prospects for Reducing the Cost for Fiber Optic Connectors," *NTT Review*, vol. 9, No. 2, pp. 52–57, Mar., 1997.
Iwano, S. et al, "Novel Flexible Fine Ferrule for Optical Fiber Connectors," *The Transactions of the IEICE*, vol. E71, No. 4, pp. 406–413, Apr., 1998.
1) PCT International Preliminary Examination Report re application No. PCT/GB99/01494; dated Sep. 14, 2000.
2) Patent Abstracts of Japan re JP 11–202155, published Jul. 30, 1999.

* cited by examiner

*Primary Examiner*—Brian Healy
(74) *Attorney, Agent, or Firm*—Cook, Alex, McFarron, Manzo, Cummings & Mehler, Ltd.

(57) ABSTRACT

A method of making an optics package is described in which an exposed length of optical fiber is deliberately subject to a predetermined bend. The relationship between the exposed length of the optical fiber and a distance between a location at which it is supported and a fixing point on an optical device is determined taking into account the induced strain in the optical fiber. An optics package designed according to the method is also set forward.

16 Claims, 2 Drawing Sheets

MANUFACTURE OF AN OPTICS PACKAGE

FIELD OF THE INVENTION

The present invention relates to a method of making an optics package, in particular one of the type in which a length of optical fibre is fixed to an integrated optics device.

BACKGROUND OF THE INVENTION

The present invention is particularly, but not exclusively, concerned with the packaging of integrated opto-electronic devices which comprise a silicon-on-insulator wafer in which are monolithically formed optical waveguides. These waveguides are defined in the surface of the silicon itself. The integrated optics device can also include electronic or optoelectronic components which are secured to the surface of the wafer. The optical fibre acts as a conduit for light onto and off the integrated optics device. It is supported within the package by an entry ferrule and extends from that to a fixing point on the integrated optics device. The design of reliable optoelectronics devices requires that the end fixtures of the optical fibre do not experience excessive forces during package temperature changes nor that the optical fibre experiences excessive strain levels.

The present invention seeks to provide a method of manufacture which attains these objectives.

SUMMARY OF THE INVENTION

According to the present invention, there is provided a method of making an optics package in which an exposed length of optical fibre extends between a supported location and a fixing point on an integrated optics device wherein the relationship between the exposed length (L) of the optical fibre and a distance ($\Delta h$) between the supported location and the fixing point on a mutually perpendicular axis is determined taking into account the induced strain in the optical fibre so that, on assembly, a predetermined bend is introduced into the exposed length of optical fibre.

The package includes a casing which has a part holding an integrated optics device and an entry part within which the optical fibre is supported at the supported location. In a situation where the casing is manufactured first, the method comprises the step of determining the vertical offset ($\Delta h$) inherent in the casing between the fixing point on the integrated optics device and the supported location. The required exposed length (L) of optical fibre is then calculated taking into account the induced strain limitations.

According to the described embodiment, the method also comprises assembling a fibre optics structure by inserting a length of optical fibre through a supporting element, cutting the length of optical fibre to the required exposed length (L), receiving the fibre optics structure in the casing which holds the integrated optics device, and fixing the optical fibre to the fixing point. The supporting element is termed herein a ferrule and comprises in the preferred embodiment a metallic outer casing housing a ceramic insert through which the optical fibre extends, as described for example in our earlier British Application No. 9814643.4.

It has been found that it is possible to design a package wherein the maximum induced strain $\epsilon_{max}$ is kept to 0.3% or below, where:

$$\epsilon_{max} = r/R \times 100,$$

R being the minimum bending radius, even when small longitudinal displacements are incurred in use due to thermal expansion and/or assembly errors.

One way of achieving this is to utilise a design technique which relies on an empirically determined design strain $\epsilon_{des}$ as discussed in more detail in relation to the preferred embodiment. Another way of achieving this for packages of the approximate dimensions discussed herein is to rely on the following equation:

$$\frac{L}{\sqrt{\Delta h}} \text{ lies in the range } 100 \times \sqrt{\frac{3r}{10}} \text{ to } 100 \times \sqrt{3r}$$

where r is the fibre radius. This has been found in practice to be a robust guide for the relationship between the exposed length L and the distance $\Delta h$ in an optoelectronic package.

The optical fibre can be fixed to the integrated optics device by inserting the fibre optics structure into the casing, with the free end of the optical fibre located just above the integrated optics device held in the casing, and then pushing the free end of the optical fibre downwards into a groove at the fixing point on the integrated optics device. The optical fibre can be secured by epoxy resin at the fixing point. This provides a so-called positive S-bend which eases assembly and produces a downwards force at the tip of the fibre in front of the fixing point.

The integrated optics device can be located within the casing on a base component such as a ceramic wafer.

According to the specific embodiment described herein, a design method is disclosed in which the optical fibre is intentionally assembled with a vertical offset $\Delta h$ between the end fixing points thereby forcing the fibre to take up a gentle positive S bend shape of known geometry. The important aspect of the S bend is that, despite the small additional strain induced in the fibre due to the bending moment from the vertical offset, compressive or tensile forces experienced by the end fixing points remain substantially constant and at a known level. This is important as the end fixings, particularly to the integrated optics device, can be relatively weak because of the limited surface area that is available to form bond surfaces. Moreover, the expected strain can be predetermined to be below a level at which short term failure would occur, that is preferably no greater than 0.3%.

For a better understanding of the present invention and to show how the same may be carried into effect, reference will now be made by way of example to the accompanying drawings.

DESCRIPTION OF THE PREFERRED EMBODIMENT

Figure 1:
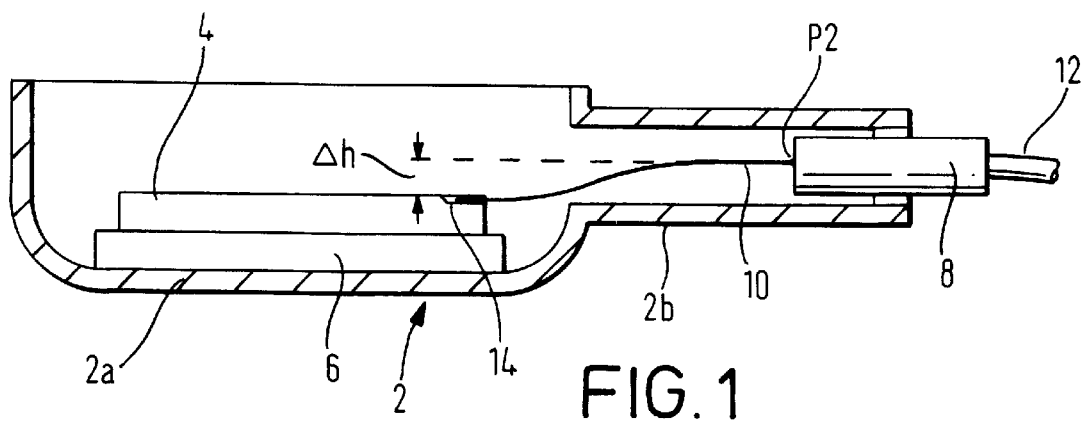
FIG. 1 is a partial section through an optics package.

FIG. 1 illustrates an optics package which comprises a casing 2 for example formed of KOVAR (Ni/Fe/Co) or another material with a high hermeticity. The casing 2 has a bowl-shaped part 2a for receiving an integrated optics device 4 on a ceramic wafer 6. The casing 2 also has a tubular entry part 2b. Although not shown, in its final form the package includes a lid so that the entire package is hermetically sealed. The entry part 2b holds a ferrule 8 which comprises a metallic outer casing, for example of brass, which holds a ceramic insert having a central bore through which extends an optical fibre 10. The optical fibre forms part of a fibre optic cable 12. The fibre optic cable 12 has a central optics core surrounded by optical cladding, and a number of protective outer layers. The optical fibre 10 has been stripped of the protective outer layers. The ferrule 8 provides a hermetically sealed structure into which the fibre optic cable 12 is inserted at one end and the optical fibre 10 protrudes from the other end. The bold line marked 10 in FIG. 1 illustrates the optical fibre in the form which it takes up in the finished package. As can be seen, this is in the form of a gentle S bend. The dotted line in FIG. 1 illustrates the optical fibre 10 during assembly as will be described in more detail hereinafter. The integrated optical device 4 has formed on its surface monolithically a number of silicon waveguides. In addition, it has a micro-machined V groove 14 in which the end portion of the fibre 10 is located adjacent its fixing point.

Figure 2:
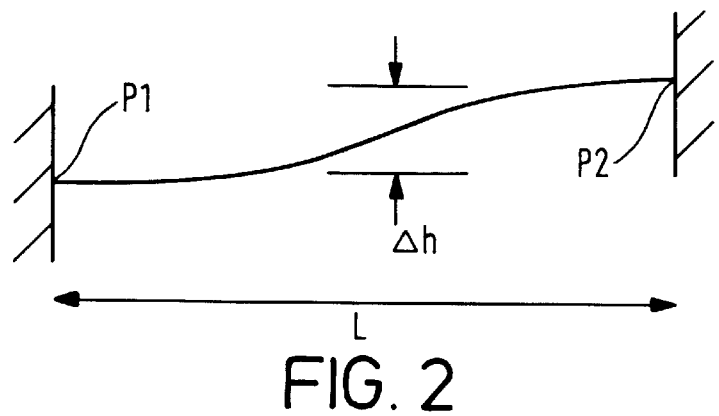
FIG. 2 is a diagram illustrating a S-bend.

FIG. 2 represents the important components of the S bend in more detail. The distance Δh represents a vertical offset between the fixing point P1 of the optical fibre to the integrated optics device and a supported location P2 which is the point at which the optical fibre 10 exits the ferrule 8. The vertical offset Δh is introduced by virtue of the fact that the central axis of the ferrule 8 is displaced vertically from the upper surface of the integrated optics device 4 so that, during assembly, the end of the optical fibre 10 remote from the ferrule 8 has to be pushed downwards onto the integrated optics device 4. Thus it can be seen that the vertical offset Δh is principally defined by the parameters of the casing 2.

The other important dimension is the "exposed" length L of optical fibre 10, this being the length between the fixing point P1 and the supported location P2. As defined herein, the length L is the horizontal distance between P1 and P2. As a matter of practicality, the actual length L' of the optical fibre is very close to the horizontal length L because the offset Δh is very small in comparison to the length L.

Figure 3:
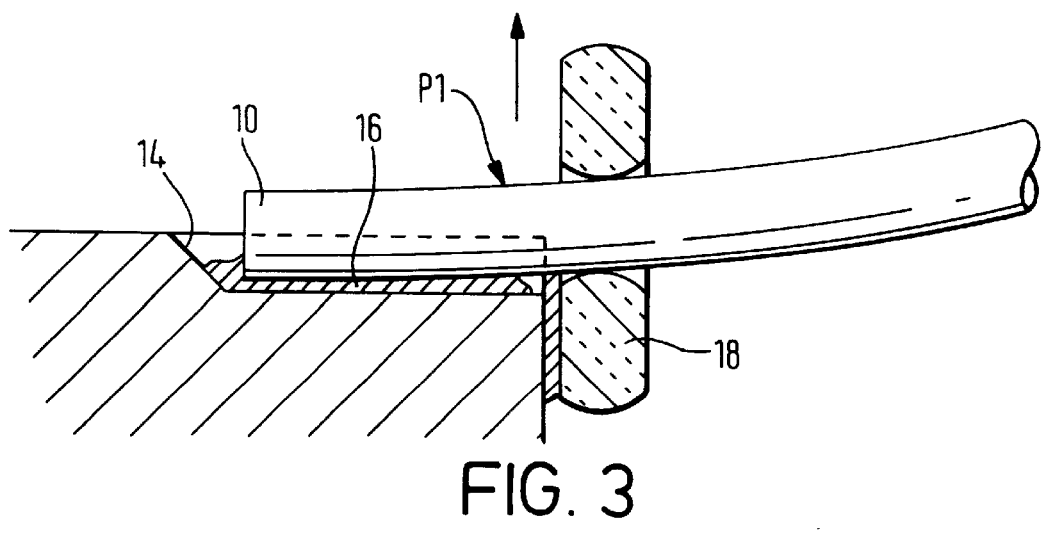
FIG. 3 is an enlarged portion of the fixing point for the optical fibre in the integrated optics device.

FIG. 3 illustrates the fixing location at the integrated optical device in more detail. The optical fibre 10 is pressed into the V groove 14 and secured there by epoxy resin 16. In FIG. 3, the optical fibre 10 is illustrated as passing through a ceramic disc 18, for example a watchmaker's jewel (as described in our earlier GB Patent 2313676B, which is also secured to the side of the integrated optics device. This provides resistance against peeling forces of the optical fibre.

A method of manufacturing the package illustrated in FIG. 1 will now be described.

A casing 2 is provided having the form illustrated in FIG. 1, in particular with the bowl-shaped receiving part 2a and entry part 2b. There is sufficient depth of the receiving part 2a to allow for receiving a ceramic wafer 6 supporting an integrated optics circuit 4 and to allow an extra distance Δh up to the horizontal central axis of the entry part 2b. The ceramic wafer 6 and integrated optics device 4 are located and secured within the casing 2.

A fibre optics structure is prepared by stripping the outer protective coatings from a fibre optic cable to provide a stripped length 10 of optical fibre. This is inserted through a ceramic insert held within a metallic tube constituting the ferrule 8. The required length L' of the optical fibre 10 in the finished package is calculated as described further herein. The actual length of optical fibre 10 extending from the ferrule 8 after assembly is cut down to the required exposed length L'. The ceramic disc 18 is threaded onto the free end of the optical fibre. The ferrule 8 is then inserted within the entry part 2b of the casing so that the optical fibre 10 extends along the axis of the entry part 2b and protrudes into the receiving part 2a. At this point, the optical fibre 10 has the profile shown as a dotted line in FIG. 1, that is with its free end located above the fixing point of the integrated optical circuit. The optical fibre is then pushed downwards into the V groove 14 and secured there by bonding with epoxy resin. In this manner, a positive S bend is deliberately introduced into the optical fibre.

The stress and strain parameters of the optical fibre are determined by the configuration of the S bend and its expected displacement during use. The most significant factor affecting longitudinal displacement are the thermal expansion coefficients of the metal used for the casing 2 and the metal used for the ferrule 8, and therefore these need to be taken into account during the design process. In fact, it has been demonstrated that if adequate account is taken of the strain parameter, small displacements are also dealt with.

Figure 4:
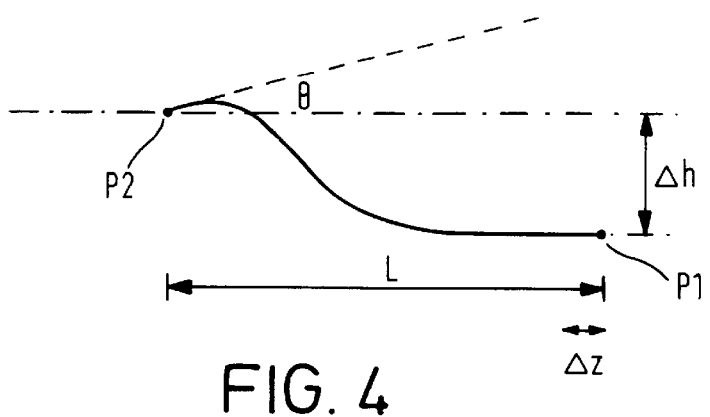
FIG. 4 illustrates the parameters of the S-bend for the design process.

A process for calculating the maximum tensile fibre strain will now be described with reference to FIG. 4. In FIG. 4, the solid line represents the horizontal distance L between the fixing points P1 and P2, and this approximates to the length L' of the optical fibre 10. Δh represents the vertical offset as already described. Δz represents the axial distance of the fibre which may occur due to fixing errors in assembly and the effects of thermal expansion and contraction. An extension of the length L to put the fibre into tension is denoted herein as a positive value for Δz, and a decrease to put the fibre into compression is noted as a negative value. θ represents an angular displacement of the ferrule at fixing point P2. That is, although during manufacture it is desirable to locate the ferrule with zero angular displacement, that is directly along the longitudinal axis of the entry part 2b of the package, errors in manufacture sometimes mean that there is a small angular displacement of the ferrule away from the axis. This is represented by the angle θ in FIG. 4. The axial displacement Δz represents not only the likely displacement due to thermal contraction or expansion in use, but also possible errors in location of the fixing point P2 during manufacture. As a matter of practicality, the configuration of the S bend can be designed without explicitly taking into account Δz or θ. It is possible to assemble a package so that parallel fixing points can generally be achieved, which means that θ is zero or close to zero in the majority of practical cases. Also, it has been established that if the strain parameters are properly dealt with, as discussed in the following, sufficient tolerance is provided for Δz under normal circumstances. A correct analysis of the configuration of the S bend based on the strain parameters also deals with the likely effect of horizontal displacements. This is discussed in more detail later herein.

The design technique will now be outlined. It is important that the S bend in the final package is a so-called positive S bend, that is as illustrated in FIG. 2. In order to accomplish this, a vertical offset Δh is first selected which is sufficiently large to ensure that the configuration of the fibre will be a positive S bend. The thickness of the ceramic wafer 6 and semiconductor wafer implementing the optics device 4 are then taken into account so that a suitable casing can be selected which implements the vertical offset Δh.

The length L' of the optical fibre can then be calculated according to the following equation:

$$L' = \sqrt{\frac{3rE\Delta h}{\sigma_{des}}}$$

where r is the fibre radius, E is Youngs modulus and $\sigma_{des}$ is the design target stress in the fibre in the absence of a horizontal displacement $\Delta z$ or angular displacement $\theta$.

A detailed discussion of the analysis of stresses and strains in a fibre optic interconnect subject to bending which forms the basis of this equation can be found in an article entitled "Predicted curvatures and stresses in a fibre optic interconnect subject to bending", by E. Suhir, Journal of Lightwave Technology, vol. 40, no. 2, February 1996.

The design stress $\sigma_{des}$ is calculated according to the following equation:

$$\sigma_{des} = E \times \epsilon_{des}$$

where E is Youngs modulus for the fibre and $\epsilon_{des}$ is an empirically determined value for the strain such that the maximum strain under normal circumstances including small horizontal and angular displacements is no greater then 0.3%. The inventors have determined that for packages of the size described herein, $\epsilon_{des}$ lies between 0.01% and 0.1% and preferably between 0.02% and 0.05%.

In order to have adequate reliability and lifetimes for an optical fibre, the maximum strain $\epsilon_{max}$ should not be allowed to exceed 0.3%.

A general purpose modelling program from ALGOR, Inc. was used to run a finite element model modelling the S-bend in order to determine its stress and strain characteristics based on the above-defined design technique.

A change in $\Delta z$ to 0.02 microns to −0.04 microns was modelled in steps of 0.005 microns over a period of one second. The model output corresponding values for the axial force T in the fibre due to each displacement value $\Delta z$ and the maximum bending moment $M_{max}$. From these values, the total maximum tensile strain in the fibre as a percentage was worked out.

Figure 5:
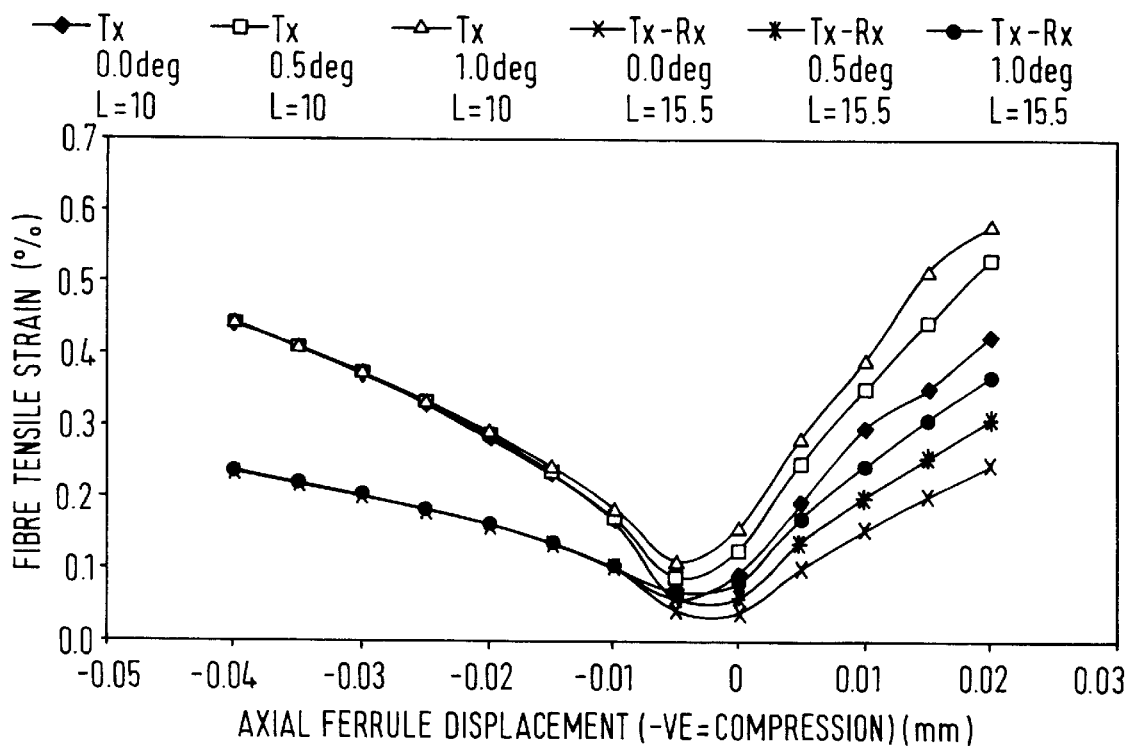
FIG. 5 is a graph of strain vs displacement for different S-bend configurations.

The results are shown in the graph of FIG. 5. FIG. 5 is a plot of the displacement $\Delta z$ from −0.04 microns to 0.02 microns against the maximum tensile strain in the fibre. The graph has a total of six plots. The diamond, square and triangular plots denote a length L of 10 mm, at angular errors $\theta$ of 0°, 0.5° and 1° respectively. The plots x, * and o are for lengths L of 15.5 mm, again at respective angular errors $\theta$ of 0°, 0.5° and 1°.

The other parameters for the plot of FIG. 5 are:

radius r=0.0625 mm

Youngs modulus E=73,000 offset $\Delta h$=0.25 mm

Thus, it can be seen that by selecting a suitable design strain in the above range a wide range of horizontal displacements $\Delta z$ can be accommodated without affecting the lifetime of the product because the maximum strain in the fibre does not exceed 0.3%.

What is claimed is:

1. A method of making an optics package in which an exposed length of optical fibre extends in the direction of a first axis between a supported location and a fixing point on an integrated optics device, the supported location being additionally offset from the fixing point in the direction of a second axis perpendicular to the first axis, wherein the relationship between an exposed length (L') of the optical fibre and a distance ($\Delta h$) between the supported location and the fixing pont on the second axis is determined taking into account an induced strain in the optical fibre so that, on assembly, a predetermined bend is introduced into the exposed length of the optical fibre, said method including the steps of determining the distance ($\Delta h$) in a casing designed to hold the integrated optics device and optical fibre and then calculating the required exposed length (L') of the optical fibre.

2. A method according to claim 1, which comprises assembling a fibre optic structure by inserting a length of optical fibre through a supporting element, cutting the length of the optical fibre to the required exposed length (L'), receiving the fibre optic structure in a casing which holds the integrated optics device, and fixing the optical fibre to the fixing point.

3. A method of making an optics package in which an exposed length of optical fibre extends in the direction of a first axis between a supported location and a fixing point on an integrated optics device, the supported location being additionally offset from the fixing point in the direction of a second axis perpendicular to the first axis, wherein the relationship between an exposed length (L') of the optical fibre and a distance ($\Delta h$) between the supported location and the fixing pont on the second axis is determined taking into account an induced strain in the optical fibre so that, on assembly, a predetermined bend is introduced into the exposed length of the optical fibre, said method including the steps of determining the distance ($\Delta h$) in a casing designed to hold the integrated optics device and optical fibre and then calculating the required exposed length (L') of the optical fibre and wherein the exposed length is calculated according to the following $$L' = \sqrt{\frac{3rE\Delta h}{\sigma_{des}}}$$

where r is the fibre radius, E is Youngs modulus and $\sigma_{des}$ is a design target stress in the absence of an angular or horizontal displacement with respect to the length direction.

4. A method according to claim 3, wherein the design target stress $\sigma_{des}$ is calculated according to the following:

$\sigma_{des}=E\times\epsilon_{des}$, where $\epsilon_{des}$ lies in the range 0.01% to 0.1%.

5. A method according to claim 4, where $\epsilon_{des}$ is in the range 0.02% to 0.05%.

6. A method of making an optics package in which an exposed length of optical fibre extends in the direction of a first axis between a supported location and a fixing point on an integrated optics device, the supported location being additionally offset from the fixing point in the direction of a second axis perpendicular to the first axis, wherein the relationship between an exposed length (L') of the optical fibre and a distance ($\Delta h$) between the supported location and the fixing point on the second axis is determined taking into account an induced strain in the optical fibre so that, on assembly, a predetermined bend is introduced into the exposed length of the optical fibre, wherein the relationship between the exposed length (L') of the optical fibre and the distance ($\Delta h$) is calculated according to the following:

$\frac{L}{\sqrt{\Delta h}}$ lies in the range $100 \times \sqrt{\frac{3r}{10}}$ to $100 \times \sqrt{3r}$ where r is the fibre radius.

7. A method according to claim 2, wherein the optical fibre is fixed to the fixing point by bonding with adhesive.

8. A method according to claim 2, wherein the optical fibre is passed through a disc prior to fixing at the fixing point, the disc being secured to the integrated optics device.

9. A method according to claim 2, wherein the optical fibre is pushed downwards into a groove at the fixing point on the integrated optics device.

10. A method according to claim 1, wherein the integrated optics device is located in the casing by securement to a base component.

11. A method according to claim 1, wherein the induced strain is designed to be below 0.3%.

12. An optics package in which an exposed length of optical fibre extends in the direction of a first axis between a supported location and a fixing point on an integrated optics device, the supported location being additionally offset from the fixing point in the direction of a second axis perpendicular to the first axis, wherein the relationship between an exposed length (L') of the optical fibre and a distance (Δh) between the supported location and the fixing point on the second axis is determined taking into account an induced strain in the optical fibre so that, on assembly, a predetermined bend is introduced into the exposed length of the optical fibre, and determining the distance (Δh) in a casing designed to hold the integrated optics device and optical fibre and then calculating the required exposed length (L') of the optical fibre.

13. An optics package according to claim 12, wherein the optical fibre passes through a disc at the fixing point, the disc being secured to the integrated optics device.

14. An optics package according to claim 12, wherein the optical fibre is located in a groove at the fixing point on the integrated optics device.

15. An optics package according to claim 12, wherein the integrated optics device is located in the casing by securement to a base component.

16. An optics package according to claim 12, wherein the optics device comprises a silicon-on-insulator wafer with monolithically formed silicon waveguides.

* * * * *